United States Patent
Take et al.

(10) Patent No.: US 8,592,072 B2
(45) Date of Patent: Nov. 26, 2013

(54) BATTERY SEPARATOR AND METHOD FOR PRODUCING THE SAME, AND LITHIUM ION SECONDARY BATTERY AND METHOD OF PRODUCING THE SAME

(75) Inventors: Hiroyoshi Take, Osaka (JP); Shunsuke Noumi, Osaka (JP); Chiharu Odane, Osaka (JP); Takuji Shintani, Osaka (JP)

(73) Assignee: Nitto Denko Corporation, Osaka (JP)

( * ) Notice: Subject to any disclaimer, the term of this patent is extended or adjusted under 35 U.S.C. 154(b) by 247 days.

(21) Appl. No.: 13/062,447

(22) PCT Filed: Sep. 7, 2009

(86) PCT No.: PCT/JP2009/065597
§ 371 (c)(1),
(2), (4) Date: Mar. 4, 2011

(87) PCT Pub. No.: WO2010/029901
PCT Pub. Date: Mar. 18, 2010

(65) Prior Publication Data
US 2011/0165449 A1 Jul. 7, 2011

(30) Foreign Application Priority Data
Sep. 9, 2008 (JP) ................................. 2008-230539

(51) Int. Cl.
*H01M 2/16* (2006.01)
*B05D 3/00* (2006.01)

(52) U.S. Cl.
USPC ........ 429/144; 429/251; 429/252; 427/393.5; 427/397.7

(58) Field of Classification Search
USPC ................. 429/144, 145, 251, 252; 29/623.3; 427/393.5, 397.7
See application file for complete search history.

(56) References Cited

U.S. PATENT DOCUMENTS

| 6,432,586 B1 | 8/2002 | Zhang |
| 7,318,984 B2 | 1/2008 | Satsuma et al. |

(Continued)

FOREIGN PATENT DOCUMENTS

| JP | 2001-319634 | 11/2001 |
| JP | 2004-047439 | 2/2004 |

(Continued)

OTHER PUBLICATIONS

Akashi, et al., "A novel Li-ion polymer secondary battery with a chemical stable gel electrolyte", Abstracts of the 46$^{th}$ Battery Symposium in Japan, pp. 342-343, 2005, with a partial English translation.

*Primary Examiner* — Stephen J. Kalafut
(74) *Attorney, Agent, or Firm* — Hamre, Schumann, Mueller & Larson, P.C.

(57) ABSTRACT

A battery separator (13) of the present invention includes a porous film (12) serving as a substrate and a crosslinked polymer layer (11) supported on the porous film (12). The crosslinked polymer layer (11) contains a crosslinked polymer and inorganic particles, and is non-porous. The crosslinked polymer is obtained by reacting a reactive polymer having a functional group in its molecule with a polyfunctional compound reactive with the functional group so as to crosslink at least a part of the reactive polymer. A lithium ion secondary battery of the present invention includes a positive electrode (14), a negative electrode (15), the battery separator (13) of the present invention disposed between the positive electrode (14) and the negative electrode (15), and a non-aqueous electrolyte solution. The battery separator (13) is disposed so that the porous film (12) faces the negative electrode (15) and the crosslinked polymer layer (11) faces the positive electrode (14).

14 Claims, 3 Drawing Sheets

(56) References Cited

U.S. PATENT DOCUMENTS

| | | | |
|---|---|---|---|
| 7,745,050 B2 | 6/2010 | Kajita et al. | |
| 2003/0215704 A1* | 11/2003 | Satsuma et al. | 429/142 |
| 2007/0178376 A1 | 8/2007 | Fujikawa et al. | |

FOREIGN PATENT DOCUMENTS

| | | |
|---|---|---|
| JP | 2007-227361 | 9/2007 |
| JP | 2008-287888 | 11/2008 |
| WO | 2008/098137 | 8/2008 |

* cited by examiner

BATTERY SEPARATOR AND METHOD FOR PRODUCING THE SAME, AND LITHIUM ION SECONDARY BATTERY AND METHOD OF PRODUCING THE SAME

TECHNICAL FIELD

The present invention relates to a battery separator, in particular to a battery separator for use in a lithium ion secondary battery, and a method of producing the same. The present invention also relates to a lithium ion secondary battery using the battery separator and a method of producing the same.

BACKGROUND ART

Recently, lithium ion secondary batteries having high energy density have been widely used as power sources for small portable electronic devices such as mobile phones and notebook-type personal computers.

Such a lithium ion secondary battery is produced through the steps of stacking sheet-like positive and negative electrodes and a separator made of, for example, a porous polyolefin resin film in layers, or rolling them up, placing the resulting layered or rolled structure in a battery case such as a metal can, pouring an electrolyte solution into the battery case, and then air-tightly sealing the battery case.

Various materials and structures have been proposed for porous polyolefin resin films used as battery separators. In particular, a porous film containing polyethylene is suitably used because such a porous film has a property that when heated, the resin melts and fills the pores, thereby allowing the battery to have a so-called shutdown function.

Meanwhile, many studies and inventions have been made on materials for positive and negative electrodes to provide high capacity and high power lithium ion secondary batteries.

In spite of these intensive studies and inventions, however, conventional lithium ion secondary batteries still have a problem such that repeated charge and discharge in a room temperature or high temperature atmosphere may cause a decrease in the capacity, a deterioration of the output characteristics, and a reduction in the safety.

One of the known causes of this problem is that if a porous film separator containing polyethylene is in contact with a positive electrode, the oxidation reaction of the separator proceeds when the battery is exposed to high temperatures in a charging state, resulting in a deterioration of the battery characteristics (see, for example Non-Patent Literature 1).

In order to solve this problem, there has been proposed, for example, a lithium ion secondary battery in which a separator including a polyolefin layer and an oxidation resistant layer is disposed between a positive electrode and a negative electrode so that the oxidation resistant layer faces the positive electrode (see Patent Literature 1). This oxidation resistant layer contains an oxidation resistant polymer. There has been proposed, as the oxidation resistant polymer, a polymer not containing a —$CH_2$— group in a main chain and not containing a —$CH(CH_3)$— group.

CITATION LIST

Patent Literature

Patent Literature 1 JP 2007-227361 A

Non-Patent Literature

Non-Patent Literature 1 Abstracts of the 46th Battery Symposium in Japan (2005), pp. 342-343

SUMMARY OF INVENTION

Technical Problem

From the viewpoint of the capacity density of a battery, battery separators are required to be as thin as possible. The same holds true for battery separators each including not only a porous film but also another layer such as an oxidation resistant layer formed thereon. However, the oxidation resistant layer as described above requires a certain thickness to have a sufficient oxidation resistant function, and such a thickness makes it difficult to maintain high capacity density of the battery.

In view of the above conventional problems and problems revealed as a result of intensive studies by the present inventors, the present invention has been made to solve these problems. Specifically, the objects of the present invention are to provide a battery separator having excellent oxidation resistance and preventing a significant decrease in the capacity density of the battery, a lithium ion secondary battery using this battery separator and thereby having excellent oxidation resistance and being less susceptible to a decrease in the battery capacity even after exposed to high temperatures in a charging state for a long period of time, a method of producing such a battery separator, and a method of producing a lithium ion secondary battery using this battery separator.

Solution to Problem

In view of the above problems and objects, the present inventors have conducted intensive studies, and as a result, completed the present invention by using the solutions described below.

The battery separator of the present invention is a battery separator including: a substrate made of a porous film; and a crosslinked polymer layer supported on the substrate. The crosslinked polymer layer contains a crosslinked polymer and inorganic particles, and is non-porous. The crosslinked polymer is obtained by reacting a reactive polymer having a functional group in its molecule with a polyfunctional compound reactive with the functional group so as to crosslink at least a part of the reactive polymer. In the present invention, the phrase "the crosslinked polymer layer is non-porous" means that the crosslinked polymer layer has an essentially negligible number of pores. As a result of the studies conducted by the present inventors, if the air permeability of the battery separator including the crosslinked polymer layer supported on one surface of the substrate is higher than that of the substrate alone by 5000 sec/100 cc or more, the crosslinked polymer layer can be regarded as non-porous. More preferably, the air permeability of the battery separator including the crosslinked polymer layer is higher than that of the substrate alone by 8000 sec/100 cc or more, and further preferably, higher by 10000 sec/100 cc or more. Therefore, when an increase in the air permeability of the battery separator including the crosslinked polymer layer supported on the substrate is in the above range, the crosslinked polymer layer can be regarded as a non-porous crosslinked polymer layer even if it has a very few pores.

The lithium ion secondary battery of the present invention is a lithium ion secondary battery including: a positive electrode; a negative electrode; a battery separator disposed between the positive electrode and the negative electrode; and a non-aqueous electrolyte solution containing a non-aqueous solvent and an electrolyte. The battery separator is the battery separator of the present invention, and is disposed between the positive electrode and the negative electrode so that the substrate faces the negative electrode and the crosslinked polymer layer faces the positive electrode.

The battery separator production method of the present invention includes the steps of:

(i) preparing a mixed solution containing a reactive polymer having a functional group in its molecule, a polyfunctional compound reactive with the functional group, inorganic particles, and a solvent;

(ii) forming a film containing the reactive polymer, the polyfunctional compound, and the inorganic particles on one surface of a substrate made of a porous film by using the mixed solution; and (iii) crosslinking at least a part of the reactive polymer by applying external energy to the film, so as to form a non-porous crosslinked polymer layer containing a crosslinked polymer and the inorganic particles and supported on the porous film.

The lithium ion secondary battery production method of the present invention includes the steps of:

(I) disposing the battery separator of the present invention between a positive electrode and a negative electrode so that the substrate faces the negative electrode and the crosslinked polymer layer faces the positive electrode, so as to form a layered structure of the positive electrode, the battery separator, and the negative electrode;

(II) placing the layered structure in a battery case; and (III) pouring an electrolyte solution into the battery case.

Advantageous Effects of Invention

In the battery separator of the present invention and a battery separator produced by the battery separator production method of the present invention (hereinafter referred to as "a battery separator obtained by the present invention"), a layer (the crosslinked polymer layer) containing inorganic particles and a crosslinked polymer, at least a part of which is crosslinked, is formed on one surface of the porous film serving as the substrate. Therefore, if the battery separator obtained by the present invention is disposed so that the crosslinked polymer layer faces the positive electrode, the porous film and the positive electrode can be physically separated from each other. With this configuration, the oxidation of the porous film, which is less resistant to oxidation in general, is inhibited, and as a result, deterioration of battery characteristics is reduced. Furthermore, since the crosslinked polymer layer is substantially non-porous in the present invention, a contact between the positive electrode and the porous film can be reduced very effectively. Therefore, even if the thickness of the crosslinked polymer layer is reduced, the oxidation inhibiting effect can be obtained sufficiently. As described above, the battery separator obtained by the present invention produces the oxidation inhibiting effect without reducing the capacity density of the battery.

Moreover, the lithium ion secondary battery of the present invention and a lithium ion secondary battery obtained by the lithium ion secondary battery production method of the present invention (hereinafter referred to as "a lithium ion secondary battery obtained by the present invention") are each provided with the battery separator that can achieve the above-mentioned advantageous effects. Therefore, these lithium ion secondary batteries have excellent oxidation resistance, and are less susceptible to deterioration of the battery capacity even after they are exposed to high temperatures in a charging state for a long period of time.

DESCRIPTION OF EMBODIMENTS

Figure 1:
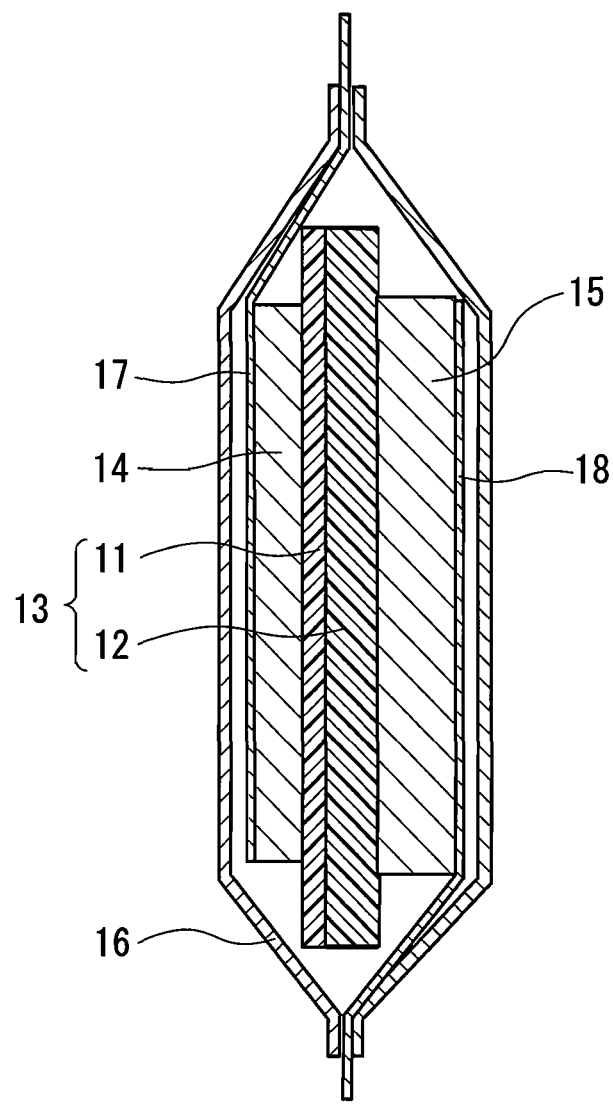
FIG. 1 is a cross sectional view showing a structural example of a battery separator of the present invention.

Hereinafter, embodiments of the present invention will be described in detail. The present invention is not limited to the following description.

[Battery Separator]

First, an embodiment of a battery separator of the present invention is described.

The battery separator of the present invention includes a substrate made of a porous film and a crosslinked polymer layer supported on the substrate.

The crosslinked polymer layer contains a crosslinked polymer and inorganic particles. The crosslinked polymer is obtained by reacting a reactive polymer having a functional group in its molecule with a polyfunctional compound reactive with the functional group so as to crosslink at least a part of the reactive polymer. In the present invention, the crosslinked polymer layer may consist of the crosslinked polymer and the inorganic particles, or may further contain another component. The crosslinked polymer layer may contain a surfactant or the like to improve the dispersibility of the inorganic particles.

The crosslinked polymer layer is non-porous.

The air-permeability of the battery separator of the present invention is not particularly limited. Preferably, the air-permeability is 5000 sec/100 cc or more, further preferably 8000 sec/100 cc or more, and particularly preferably 10000 sec/100 cc or more.

In the battery separator of the present invention, the crosslinked polymer layer supported on the porous film swells in the electrolyte solution and acts as an ion-conductive gel electrolyte. Therefore, the crosslinked polymer layer does not inhibit the cell reaction even if it is non-porous.

First, the crosslinked polymer layer is described in detail.

Preferably, the crosslinked polymer constituting the crosslinked polymer layer is obtained by using a (meth)acrylate copolymer as the reactive polymer, for example. In this case, the crosslinked polymer is obtained by crosslinking at least a part of the (meth)acrylate copolymer. Since a (meth)acrylate copolymer not only is inexpensive but also has excellent film formation properties and flexibility, the use of the (meth)acrylate copolymer allows a thin, uniform non-porous crosslinked polymer layer to be suitably obtained. Furthermore, the resulting crosslinked polymer layer has excellent flexibility.

The (meth)acrylate copolymer is not particularly limited, and can be obtained by radical copolymerization. This radical copolymerization can be conducted by any polymerization process, such as solution polymerization, bulk polymerization, suspension polymerization, or emulsion polymerization. In view of the ease of polymerization, adjustment of molecular weight, etc., solution polymerization and suspension polymerization are preferably used.

Monomers constituting the (meth)acrylate copolymer are not particularly limited. For example, monomers such as methyl(meth)acrylate, ethyl(meth)acrylate, propyl(meth) acrylate, butyl(meth)acrylate, 2-ethylhexyl(meth)acrylate, and 2-methoxyethyl(meth)acrylate can be used. (Meth) acrylic acid, 2-hydroxyethyl acrylate, 2-hydroxypropyl acrylate, 4-hydroxybutyl acrylate, etc. also may be used to introduce reactive groups mentioned below. The present inventors have conducted intensive studies, and as a result they have found out that crosslinked polymers obtained by using the above-mentioned polymers have more excellent oxidation resistance than crosslinked polymers obtained by using reactive polymers containing, as reactive groups, cationically polymerizable functional groups such as an oxetanyl group and an epoxy group if they have similar degrees of crosslinking. Therefore, if a reactive polymer substantially not containing cationically polymerizable functional groups such as an oxetanyl group and an epoxy group is used, the resulting crosslinked polymer has excellent oxidation resistance at a lower degree of crosslinking.

In the present invention, it is preferable to use a polyfunctional isocyanate as the polyfunctional compound and to use a polymer having a reactive group reactive with an isocyanate group as the reactive polymer. In a crosslinked polymer obtained by reacting such a reactive polymer with such a polyfunctional isocyanate so as to crosslink at least a part of the reactive polymer, the polyfunctional isocyanate used as a crosslinking agent is incorporated into the resulting crosslinked polymer by addition polymerization. Therefore, when a porous film having such a crosslinked polymer supported thereon is used as a battery separator, no dissolution of the crosslinked polymer in an electrolyte solution takes place, and hence there is no deterioration in the battery characteristics.

The reactive group reactive with an isocyanate group is not particularly limited. Examples of such a reactive group include a hydroxyl group, a carboxyl group, an amino group, an imino group, an urethane group, an urea group, etc. Among these, a hydroxyl group and a carboxyl group are particularly preferable. Therefore, when a polyfunctional isocyanate is used as a crosslinking agent, polymers into which reactive groups such as a hydroxyl group and a carboxyl group are introduced are suitably used.

Any crosslinked polymer can be used in the present invention as long as at least a part of the reactive polymer is crosslinked. Preferably, the crosslinked polymer has a high degree of crosslinking to further improve the oxidation resistance of the battery separator. Therefore, in the present invention, the gel fraction of the crosslinked polymer layer is preferably 30% or more, and more preferably 60% or more. If the gel fraction is 30% or more, the degree of crosslinking of the crosslinked polymer is sufficiently high, and thus a battery separator having more excellent oxidation resistance can be provided.

The crosslinked polymer layer has a thickness of 0.01 to 5 μm, for example. When the thickness of the crosslinked polymer layer is less than 0.01 μm, it is difficult to separate the positive electrode and the porous film completely from each other, which may cause variations in the effect of improving the oxidation resistance of the battery separator. On the other hand, when the thickness of the crosslinked polymer layer is more than 5 μm, the entire thickness of the battery separator including the porous film and the crosslinked polymer layer supported thereon increases, which may cause a decrease in the capacity density of the battery. Preferably, the thickness of the crosslinked polymer layer is in the range of 0.05 to 1 μm. In the battery separator of the present invention, the crosslinked polymer layer is non-porous. Therefore, even if the thickness of the crosslinked polymer layer is 1 μm or less, the battery separator can still have sufficient oxidation resistance. If the thickness of the crosslinked polymer layer is 1 μm or less, an increase in the thickness of the battery separator can be reduced, which is advantageous in terms of the capacity density of the battery. Accordingly, when the crosslinked polymer layer has a thickness of 0.05 to 1 μm, the resulting battery separator can achieve the oxidation inhibiting effect while sufficiently reducing the decrease in the capacity density of the battery.

In the battery separator of the present invention, the crosslinked polymer layer contains inorganic particles. Inorganic particles have excellent oxidation resistance. Therefore, according to the present invention, a crosslinked polymer layer having more excellent oxidation resistance can be obtained. As a result of intensive studies, the present inventors have found out that the crosslinked polymer layer containing inorganic particles improves its lithium ion transference number. Therefore, according to the present invention, a battery separator having excellent output characteristics can be obtained. The lithium ion transference number is the fraction of electric current carried by lithium ions. If the lithium ion transference number is low, the mobility of anions that do not contribute directly to the electrode reaction increases, and the concentration polarization increases accordingly. As a result, the output characteristics are degraded. Furthermore, the use of the crosslinked polymer layer containing inorganic particles reduces the deterioration in the output characteristics even after the battery is exposed to high temperatures in a charging state for a long period of time. The reason is not known exactly, but probably the inorganic particles inhibit the degradation of the crosslinked polymer layer caused by long-term exposure to high temperature in the charging state.

In the present invention, the inorganic particles contained in the crosslinked polymer layer are not particularly limited. Alumina, silica, titania, zirconia, etc. can be used. Among these, silica is preferably used because of the versatility of the material.

The inorganic particles may be surface-modified but need not be surface modified as long as they do not impair their dispersibility in the crosslinked polymer. That is, in the present invention, it is not necessary to take into particular consideration the influences of the surface reactivity of the inorganic particles on the battery characteristics. This is because, in the battery separator of the present invention, the inorganic particles are present as the non-porous crosslinked polymer containing these particles, and therefore the deterioration of the battery characteristics caused by the surface reactivity or the like of the inorganic particles does not occur.

The particle size of the inorganic particles used in the present invention is not particularly limited. Preferably, the particle size is in the range of 10 to 200 nm. If the particles with a diameter of about one tenth of the thickness of the crosslinked polymer layer are used, the inorganic particles can be dispersed in a good condition in the crosslinked polymer layer. More preferably, the particle size is in the range of 10 to 100 nm, and further preferably 10 to 50 nm. The particle shape may be either spherical or non-spherical, and is not particularly limited. In the present invention, the particle size of inorganic particles means the calculated particle size of the inorganic particles alone obtained by using a transmission electron microscope.

Preferably, the crosslinked polymer layer contains 4.5 to 60% by weight of the inorganic particles. That is, the weight content of the inorganic particles in the entire crosslinked polymer layer is preferably 4.5 to 60% by weight. Since the crosslinked polymer layer containing this amount of inorganic particles has excellent film uniformity, good oxidation resistance is achieved. Furthermore, when the battery separator described above is used, the resulting lithium ion secondary battery has excellent initial rate characteristics and good oxidation resistance, and is less susceptible to deterioration of output characteristics even after it is exposed to high temperatures in a charging state for a long period of time.

Next, the porous film serving as a substrate is described in detail.

Preferably, the thickness of the porous film serving as a substrate is in the range of 3 to 100 µm. If the porous film has a thickness of less than 3 µm, it is difficult for the film to have sufficient strength. Therefore, when it is used as a substrate, the positive and negative electrodes may come into contact with each other and cause an internal short-circuit. On the other hand, if the porous film has a thickness of more than 100 µm, the film resistance of the resulting separator may increase and cause a deterioration of the rate characteristics.

As the porous film, a film having pores with an average pore size of 0.01 to 5 µm and a porosity of 20 to 95 vol % can be used. A film that can be used suitably as the substrate of the battery separator of the present invention preferably has a porosity of 30 to 90 vol %, and more preferably 40 to 85 vol %.

In the case where a porous film having a too low porosity is used as the substrate of the battery separator, the ion conducting paths are reduced, which may cause insufficient battery characteristics. In the case where a porous film having a too high porosity is used as the substrate of the battery separator, it may have insufficient strength. If the strength is insufficient, a thicker film must be used to have a required strength, which results in an undesirable increase in the internal resistance of the battery. Therefore, it is desirable to select a porous film having a porosity falling within the above range.

Furthermore, it is desirable to use a porous film having an air permeability of 1500 sec/100 cc or less, and preferably 1000 sec/100 cc or less. If a porous film having a too high value of the air permeability is used as the substrate, the ion conductivity of the battery separator decreases, which may make it difficult to obtain sufficient battery characteristics.

Preferably, the porous film has a puncture strength of 1 N or higher. If the puncture strength is lower than 1 N, the porous film may be broken when the contact pressure is applied between the electrodes, which may cause an internal short-circuit.

Any porous film may be used as the substrate of the battery separator of the present invention without any particular limitation as long as it has the properties as mentioned above. In view of the solvent resistance and redox resistance, a porous film made of a polyolefin resin such as polyethylene or polypropylene is suitably used.

Among these, a porous film made of polyethylene resin is particularly suitable because it has a property such that when heated, the resin melts and fills the pores, thereby allowing the battery to have a so-called shutdown function. As stated herein, the polyethylene resins include not only homopolymers of ethylene but also copolymers of ethylene and α-olefins such as propylene, butene, and hexene.

Next, the battery separator production method of the present invention is described.

The battery separator production method of the present invention includes:

(i) preparing a mixed solution containing a reactive polymer having a functional group in its molecule, a polyfunctional compound reactive with the functional group, inorganic particles, and a solvent;

(ii) forming a film containing the reactive polymer, the polyfunctional compound, and the inorganic particles on one surface of a substrate made of a porous film by using the mixed solution; and (iii) crosslinking at least a part of the reactive polymer by applying external energy to the film, so as to form a non-porous crosslinked polymer layer containing a crosslinked polymer and the inorganic particles and supported on the porous film. The details of the crosslinked polymer layer, the inorganic particles, the reactive polymer, the polyfunctional compound, and the porous film have been described above.

As the solvent of the mixed solution prepared in the step (i), an organic solvent such as acetone, ethyl acetate, or butyl acetate can be used as appropriate. The mixed solution is prepared by dissolving the reactive polymer, the polyfunctional compound, and the inorganic particles in such an organic solvent.

Next, in the step (ii), this mixed solution is applied to the surface of the substrate by, for example, casting or spraying, or the substrate is immersed in the polymer solution, followed by drying to remove the organic solvent. Thus, a film containing the reactive polymer, the polyfunctional compound, and the inorganic particles is formed.

The battery separator of the present invention also can be produced by a method different from the above-described production method. For example, the battery separator of the present invention can be obtained by a method in which a mixture of the reactive polymer, the polyfunctional compound, and the inorganic particles is formed into a film by melt extrusion, the film thus formed is laminated to the substrate by heat lamination or the like to form a film containing the reactive polymer, the polyfunctional compound, and the inorganic particles, and furthermore external energy is applied to the resulting film.

The inorganic particles used in the production method of the present invention may be inorganic particles alone, or may be obtained by previously dispersing inorganic particles in an organic solvent such as methanol, isopropanol, or methyl ethyl ketone. The form of the inorganic particles is not particularly limited.

A method for applying external energy to the film in the step (iii) is not particularly limited. The external energy is applied, for example, by heating the film, or irradiating the film with electron beams or ultraviolet light.

[Lithium Ion Secondary Battery]

The lithium ion secondary battery of the present invention includes a positive electrode, a negative electrode, the battery separator of the present invention disposed between the positive electrode and the negative electrode, and a non-aqueous electrolyte solution containing a non-aqueous solvent and an electrolyte. The battery separator is disposed between the positive electrode and the negative electrode so that the substrate faces the negative electrode and the crosslinked polymer layer faces the positive electrode.

In the case where a battery is configured so that a porous film and a positive electrode are in contact with each other in the battery, the porous film is oxidized preferentially at the three-phase interface between the positive electrode, the electrolyte solution, and the porous film. Therefore, with such a configuration as that of the present invention, in which the battery separator is disposed to keep the substrate made of the porous film from coming in contact with the positive electrode, the oxidation of the battery separator is inhibited, and a lithium ion secondary battery that is less susceptible to deterioration of the battery capacity even after it is exposed to high temperatures in a charging state for a long period of time can be provided.

Figure 2:
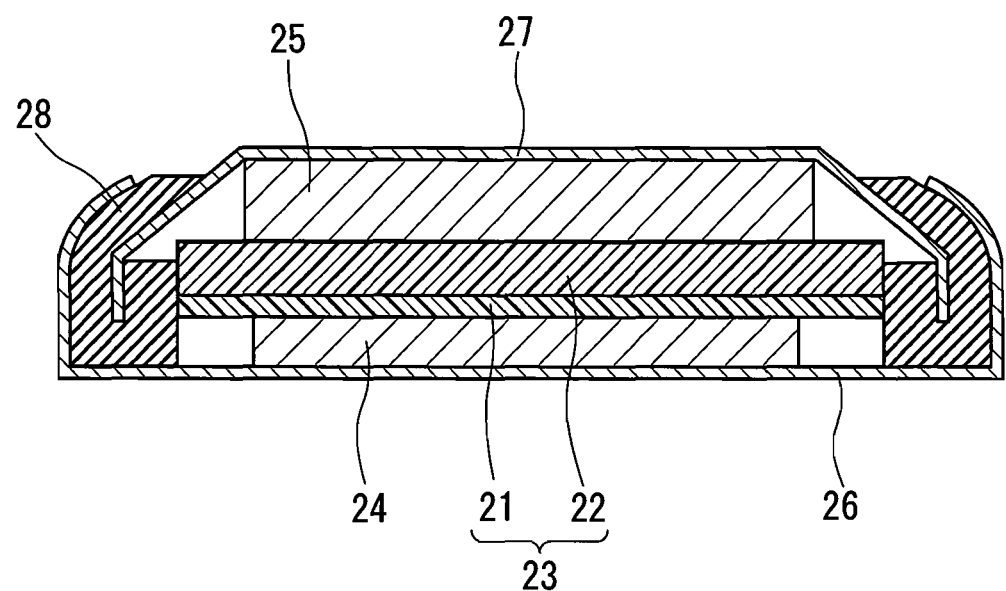
FIG. 2 is a cross sectional view showing another structural example of a battery separator of the present invention.

With the use of the battery separator of the present invention interposed between the positive electrode and the negative electrode, as in the case of conventional battery separators, a lithium ion secondary battery can be assembled. The materials of the positive electrode, the negative electrode, the battery case, the electrolyte solution, etc. and the configuration of these components can be the same as those of a known lithium ion secondary battery. For example, it is possible to configure a laminate-type lithium ion secondary battery as shown in FIG. 1, in which a battery separator 13 including a porous film (substrate) 12 and a crosslinked polymer layer 11 containing inorganic particles and supported on one surface of the porous film 12 is disposed between a positive electrode 14 and a negative electrode 15, they are placed in an aluminum laminate package (battery case) 16, and the package is filled with a non-aqueous electrolyte solution (not shown). In FIG. 1, the reference numerals 17 and 18 denote a positive electrode collector and a negative electrode collector respectively. It is also possible to configure a coin-type lithium ion secondary battery as shown in FIG. 2, in which a battery separator 23 including a porous film 22 and a crosslinked polymer layer 21 containing inorganic particles and supported on one surface of the porous film 22 is disposed between a positive electrode 24 and a negative electrode 25, and they are placed in a battery case. The battery case shown in FIG. 2 is composed of a positive electrode can 26 and a negative electrode can 27. They are sealed with a gasket 28, and are filled with a non-aqueous electrolyte solution (not shown).

Any commonly used positive electrode active material can be used as long as it is commonly used as a positive electrode of a lithium ion secondary battery. For example, lithium cobalt oxide, lithium manganese oxide spinel, lithium nickel oxide, olivine-type lithium iron phosphate, etc. can be suitably used.

Any commonly used negative electrode active material can be used as long as it is commonly used as a negative electrode of a lithium ion secondary battery. For example, carbonaceous materials such as graphite, amorphous carbon, and carbon fiber can be suitably used.

In the lithium ion secondary battery of the present invention, an electrolyte salt such as lithium hexafluorophosphate, lithium tetrafluoroborate, lithium perchlorate, etc. can be suitably used for the non-aqueous electrolyte solution.

Furthermore, in the lithium ion secondary battery of the present invention, any solvent can be used as the non-aqueous solvent for the above electrolyte salts as long as it dissolves these electrolyte salts. Examples of the non-aqueous solvent include: cyclic esters such as ethylene carbonate, propylene carbonate, butylene carbonate, and γ-butyrolactone; ethers such as tetrahydrofuran and dimethoxyethane; and chain esters such as dimethyl carbonate, diethyl carbonate, and ethyl methyl carbonate. These solvents can be used alone or as a mixture of two or more.

Next, the lithium ion secondary battery production method of the present invention is described.

The lithium ion secondary battery production method of the present invention includes the steps of:

(I) disposing the above-described battery separator of the present invention between a positive electrode and a negative electrode so that the substrate faces the negative electrode and the crosslinked polymer layer faces the positive electrode, so as to form a layered structure of the positive electrode, the battery separator, and the negative electrode;

(II) placing the layered structure in a battery case; and (III) pouring an electrolyte solution into the battery case.

In the step (III), when the electrolyte solution is poured into the battery case containing the layered structure (a set of electrodes) including the battery separator of the present invention, at least a part of the crosslinked polymer layer constituting the battery separator swells in the electrolyte solution and gelates. As a result, the non-porous crosslinked polymer layer turns into a gel electrolyte layer. In this way, the crosslinked polymer layer acts as a gel electrolyte, and therefore, the cell reaction is not inhibited even if the crosslinked polymer layer is non-porous. Thus, good battery characteristics can be achieved.

EXAMPLES

Next, the battery separator and the lithium ion secondary battery of the present invention are specifically described with reference to the following examples. The present invention is by no means limited by the following examples.

First, the measurement methods of the physical properties of battery separators prepared in the following examples and comparative examples, and those of the resulting battery characteristics are described.

[Physical Properties of Battery Separator]

<Thickness of Porous Film (Substrate)>

The thickness was measured with a 1/10000 mm thickness gauge.

<Thickness of Crosslinked Polymer Layer>

A porous film on which a crosslinked polymer layer was supported was cut so that the cross section of the crosslinked polymer was exposed, and the thickness of the crosslinked polymer layer was measured using a scanning electron micrograph of the cross section taken at a magnification of 10000 times.

<Porosity of Porous Film (Substrate)>

The porosity of the porous film was calculated by the following equation:

$$\text{Porosity (vol \%)} = (1 - W/(S \times t \times d)) \times 100$$

where $S$ (cm$^2$) is the area of the porous film, $W$ (g) is the weight thereof, $t$ (cm) is the average thickness thereof, and $d$ (g/cm$^3$) is the density of the resin constituting the porous film.

<Air Permeability of Battery Separator and that of Porous Film Alone>

The air permeability of the battery separator was measured according to JIS P 8117. Before the crosslinked polymer layer was supported on the porous film, the air permeability of the porous film alone was measured according to JIS P 8117.

<Puncture Strength of Porous Film (Substrate)>

The puncture strength of the porous film was measured using a compression tester "ICES-G5" manufactured by Kato Tech Co., Ltd. The maximum load was read from the load displacement curve obtained from the measurement, and it was determined as a puncture strength. The needle used was one with a diameter of 1.0 mm and a curvature radius of 0.5 mm at the tip. The measurement was carried out at a puncture speed of 2 mm/sec.

<Measurement of Gel Fraction of Crosslinked Polymer Layer>

A battery separator in which a previously measured weight of crosslinked polymer layer is supported on a substrate was previously prepared, and this battery separator was immersed in ethyl acetate. The battery separator in ethyl acetate was shaken for 24 hours so as to elute uncrosslinked polymer contained in the crosslinked polymer layer in ethyl acetate and remove it. Then, the battery separator in which only components that are insoluble in ethyl acetate (insoluble components) were supported on the substrate was dried and weighed, and the weight of the insoluble components was calculated. The gel fraction was calculated from the ratio of the weight of the insoluble components to the weight of the original crosslinked polymer layer, and the degree of crosslinking was evaluated based on the gel fraction.

[Battery Characteristics]

<Initial Characteristics of Battery>

The initial characteristics (initial charge capacity, initial discharge capacity, and initial charge-discharge efficiency) of lithium ion secondary batteries obtained in the following examples and comparative examples were examined. First, each battery was charged at a constant temperature (25° C.) and a constant current of 4 mA until the voltage reached 4.2 V. Then, the battery was charged at a constant voltage of 4.2 V until the current decayed to 0.2 mA. The integrated value of the current values thus obtained was determined as the initial charge capacity. Next, after a 20-minute break, the battery was discharged to 2.75 V at a constant current of 4 mA. The capacity thus obtained was determined as the initial discharge capacity. The ratio of the initial discharge capacity to the initial charge capacity (initial discharge capacity/initial charge capacity) was calculated as the initial charge-discharge efficiency.

<Initial Output Characteristics of Battery>

After the initial characteristics of each lithium ion secondary battery were evaluated, the initial output characteristics thereof were examined. First, each battery was charged at a constant temperature (25° C.) and a constant current of 4 mA until the voltage reached 4.2 V. Then, the battery was charged at a constant voltage of 4.2 V until the current decayed to 0.2 mA. Next, after a 20-minute break, the battery was discharged to 2.75 V at a constant current of 40 mA. The capacity thus obtained was determined as the 0.5-hour rate discharge capacity. Furthermore, the ratio of the 0.5-hour rate discharge capacity to the previously measured initial discharge capacity was calculated and determined as the 0.5-hour rate discharge capacity ratio (0.5-hour rate discharge capacity/initial discharge capacity).

<Oxidation Resistance of Battery>

After the initial characteristics of each lithium ion secondary battery were evaluated, the oxidation resistance thereof was examined. First, each battery was placed in a thermostatic bath set at 60° C., and charged at a constant current of 4 mA until the voltage reached 4.25 V. Then, in the 60° C. atmosphere, the charge was continued at the constant voltage of 4.25V until the total charge time reached 240 hours. Next, after a 20-minute break, the battery was discharged to 2.75 V at a constant current of 4 mA. The oxidation resistance was evaluated based on the capacity thus obtained.

<Output Characteristics after Oxidation Resistance Test>

After the oxidation resistance of each lithium ion secondary battery was evaluated, the output characteristics thereof were examined. First, each battery was taken out of the thermostatic bath set at 60° C., and allowed to stand until the temperature dropped sufficiently. Next, the battery was charged at a constant temperature (25° C.) and a constant current of 4 mA until the voltage reached 4.2 V. Then, the battery was charged at a constant voltage of 4.2 V until the current decayed to 0.2 mA. Next, after a 20-minute break, the battery was discharged to 2.75 V at a constant current of 4 mA. The capacity thus obtained was determined as the 5-hour rate discharge capacity. Next, the battery was charged at a constant temperature (25° C.) and a constant current of 4 mA until the voltage reached 4.2 V. Then, the battery was charged at a constant voltage of 4.2 V until the current decayed to 0.2 mA. Next, after a 20-minute break, the battery was discharged to 2.75 V at a constant current of 20 mA. The capacity thus obtained was determined as the 1-hour rate discharge capacity. The ratio of the 1-hour rate discharge capacity to the previously measured 5-hour rate discharge capacity (1-hour rate discharge capacity/5-hour rate discharge capacity) was calculated and determined as the 1-hour rate discharge capacity ratio after the oxidation resistance test.

Next, each of the battery separators prepared as examples and comparative examples, and each of the lithium ion secondary batteries using these battery separators are described in detail.

Example 1

Battery Separator 51 g of methyl methacrylate, 48.16 g of 2-methoxyethyl acrylate, 0.84 g of 4-hydroxybutyl acrylate, 67 g of ethyl acetate, and 0.1 g of N,N'-azobisisobutyronitrile were placed in a 500 mL capacity three-necked flask equipped with a reflux condenser, and stirred and mixed for 30 minutes while nitrogen gas was introduced into the flask. Then, the resulting mixture was heated to 64° C. After about one hour, the viscosity of the reaction mixture began to increase as the radical polymerization proceeded. After the polymerization was continued for 8 hours under the same conditions, the reaction mixture was cooled to about 40° C., and 0.1 g of N,N'-azobisisobutyronitrile was again added to the reaction mixture, followed by heating again to 70° C. and post-polymerization for another 8 hours. Then, the reaction mixture was cooled to about 40° C., and 166 g of ethyl acetate was added to the reaction mixture, which was stirred and mixed until the whole mixture became homogeneous. Thus, an ethyl acetate solution 1 of a (meth)acrylate copolymer (a reactive polymer having a hydroxyl group as a reactive group) was obtained.

Then, ethyl acetate was added to the ethyl acetate solution 1. The resulting mixture was stirred at room temperature. Thus, a homogeneous polymer solution 2 with a concentration of 3.99% by weight was obtained.

Next, as inorganic particles, a silica particle dispersion liquid 3 ("MEK-ST" manufactured by Nissan Chemical Industries. Ltd.: a methyl ethyl ketone solution of a silica sol, with a solid content of 30% by weight, and a silica particle size of 10 to 20 nm) was added to the polymer solution 2 so that the ratio of the solids in the silica particle dispersion liquid 3 to the solids in the polymer solution 2 was 30% by weight. Thus, an inorganic particle/crosslinked polymer mixed solution 4 was obtained.

Next, ethyl acetate was added to a polyfunctional isocyanate ("Coronate HL" manufactured by Nippon Polyurethane Industry Co., Ltd.: an ethyl acetate solution of a trimethylolpropane adduct of hexamethylene diisocyanate, with a solid content of 75% by weight) as a crosslinking agent (polyfunctional compound). Thus, a crosslinking agent solution 5 with a solid content of 10% by weight was obtained.

Then, the crosslinking agent solution 5 was added to the inorganic particle/crosslinked polymer mixed solution 4 so that the ratio of the solids in the crosslinking agent solution 5 to the solid crosslinked polymer in the inorganic particle/crosslinked polymer mixed solution 4 was 0.7% by weight. The solid content of the resulting mixed solution 6 was 5% by weight.

The mixed solution 6 thus obtained was applied onto one surface of a porous polyethylene resin film as a substrate (with a thickness of 16 μm, a porosity of 60%, an air permeability of 100 sec/100 cc, and a puncture strength of 3.0 N) with a wire bar (#20), and heated and dried at 50° C. to evaporate ethyl acetate. Then, the film was placed in a drying oven at 90° C. for 168 hours so that the (meth)acrylate copolymer was isocyanate-crosslinked. In this way, a battery separator of Example 1, including a porous film and a layer (crosslinked polymer layer) containing a crosslinked (meth) acrylate copolymer and inorganic particles and supported on one surface of the porous film, was obtained. The content of silica particles in the crosslinked polymer layer thus obtained was 23.1% by weight. The thickness of the crosslinked polymer layer was 0.27 μm. The measured air permeability of the battery separator was 10000 sec/100 cc or more. This result confirmed that a substantially non-porous crosslinked polymer layer was supported. Furthermore, the measured gel fraction was 47%. This result confirmed that a part of the crosslinked polymer layer thus prepared was crosslinked.

<Electrode Sheet>

85 parts by weight of lithium cobalt oxide ("Cellseed C-10" manufactured by Nippon Chemical Industrial Co., Ltd.) as a positive electrode active material, 10 parts by weight of acetylene black ("Denka Black" manufactured by Denki Kagaku Kogyo K.K.) as a conductive auxiliary material, and 5 parts by weight of a vinylidene fluoride resin ("KF Polymer L #1120" manufactured by Kureha Corporation) as a binder were mixed together. The resulting mixture was mixed with N-methyl-2-pyrrolidone to prepare a slurry with a solid content of 15% by weight.

This slurry was applied in a thickness of 200 μm onto a 20 μm-thick aluminum foil (collector). Subsequently, the resulting coating film was dried at 80° C. for 1 hour and at 120° C. for 2 hours, and then pressed by a roll press. Thus, a sheet having a positive electrode active material layer with a thickness of 100 μm was prepared. This sheet was used to prepare a positive electrode sheet having a 27-mm square positive electrode active material portion and a tab portion. Then, an aluminum tab was connected to the tab portion of this positive electrode sheet by spot welding to obtain a flag-shaped positive electrode sheet.

80 parts by weight of mesocarbon microbeads ("MCMB 6-28" manufactured by Osaka Gas Chemicals Co., Ltd.) as a negative electrode active material, 10 parts by weight of acetylene black ("Denka Black" manufactured by Denki Kagaku Kogyo K.K.) as a conductive auxiliary material, and 10 parts by weight of a vinylidene fluoride resin ("KF Polymer L #1120" manufactured by Kureha Corporation) as a binder were mixed together. The resulting mixture was mixed with N-methyl-2-pyrrolidone to prepare a slurry with a solid content of 15% by weight.

This slurry was applied in a thickness of 200 μm on a 20 μm-thick copper foil (collector). Subsequently, the resulting coating film was dried at 80° C. for 1 hour and at 120° C. for 2 hours, and then pressed by a roll press. Thus, a sheet having a negative electrode active material layer with a thickness of 100 μm was prepared. This sheet was used to prepare a negative electrode sheet having a 29-mm square negative electrode active material portion and a tab portion. Then, a nickel tab was connected to the tab portion of this negative electrode sheet by spot welding to obtain a flag-shaped negative electrode sheet.

<Preparation of Lithium Ion Secondary Battery>

The battery separator of Example 1 was placed on the negative electrode sheet obtained in the manner as described in the preparation of the electrode sheet so that the porous film faced the negative electrode sheet. Furthermore, the positive electrode sheet obtained in the manner as described in the preparation of the electrode sheet was placed on the battery separator. Thus, a layered structure (a set of electrodes) including the positive electrode sheet, the battery separator, and the negative electrode sheet was prepared. The layered structure thus obtained was placed in an aluminum laminate package, an electrolytic solution obtained by dissolving lithium hexafluorophosphate in a mixed solvent of ethylene carbonate and diethyl carbonate (at a ratio of 1:1 by weight) at a concentration of 1.0 mol/L was poured into the package, and then the package was sealed. Thus, a lithium ion secondary battery of Example 1 was assembled.

Example 2

Battery Separator

A silica particle dispersion liquid 7 as inorganic particles was added to the polymer solution 2 prepared in the same manner as in Example 1. The silica particle dispersion liquid 7 ("MEK-ST-L" manufactured by Nissan Chemical Industries. Ltd.: a methyl ethyl ketone solution of a silica sol, with a solid content of 30% by weight, and a silica particle size of 40 to 50 nm) was added to the polymer solution 2 so that the ratio of the solids in the silica particle dispersion liquid 7 to the solids in the polymer solution 2 was 30% by weight. Thus, an inorganic particle/crosslinked polymer mixed solution 8 was obtained.

Next, the crosslinking agent solution 5 used in Example 1 was prepared, and added to the inorganic particle/crosslinked polymer mixed solution 8 so that the ratio of the solids in the crosslinking agent solution 5 to the solid crosslinked polymer in the inorganic particle/crosslinked polymer mixed solution 8 was 0.7% by weight. The solid content of the resulting mixed solution 9 was 5% by weight.

The mixed solution 9 thus obtained was applied onto one surface of a porous polyethylene resin film (with a thickness of 16 μm, a porosity of 60%, an air permeability of 100 sec/100 cc, and a puncture strength of 3.0 N) with a wire bar (#20), and heated and dried at 50° C. to evaporate ethyl acetate. Then, the film was placed in a drying oven at 90° C. for 168 hours so that the (meth)acrylate copolymer was isocyanate-crosslinked. In this way, a battery separator of Example 2, including a porous film and a layer (crosslinked polymer layer) containing a crosslinked (meth)acrylate copolymer and inorganic particles and supported on one surface of the porous film, was obtained. The content of silica particles in the crosslinked polymer layer thus obtained was 23.1% by weight.

Figure 3:
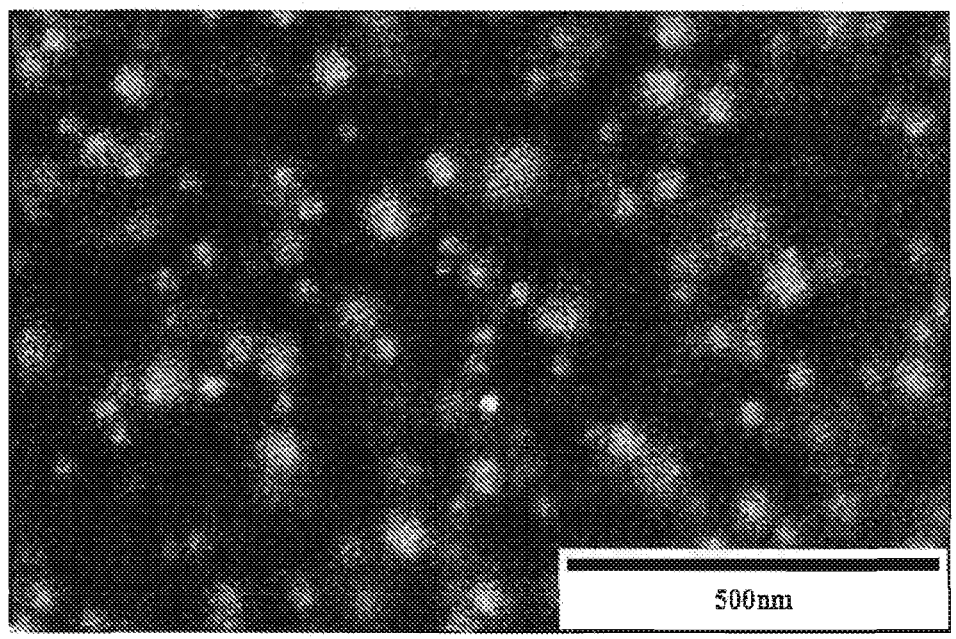
FIG. 3 is a scanning electron micrograph of a battery separator of Example 2 observed with a scanning electron microscope from the direction of the surface of a crosslinked polymer layer.

The battery separator of Example 2 was observed with a scanning electron microscope from the direction of the surface of the crosslinked polymer layer. FIG. 3 shows the resulting scanning electron micrograph. This micrograph shows that silica particles are uniformly dispersed on the surface of the crosslinked polymer layer. Furthermore, since the porous film is not exposed, which indicates that the crosslinked polymer layer is formed uniformly all over one surface of the porous film.

The thickness of the resulting crosslinked polymer layer was 0.30 μm. The measured air permeability of the battery separator was 10000 sec/100 cc or more. This result confirmed that a substantially non-porous crosslinked polymer layer was supported. Furthermore, the measured gel fraction was 38%. This result confirmed that a part of the crosslinked polymer layer thus prepared was crosslinked.

<Electrode Sheet>

A positive electrode sheet and a negative electrode sheet were prepared in the same manner as in Example 1.

<Preparation of Lithium Ion Secondary Battery>

A lithium ion secondary battery was prepared in the same manner as in Example 1 except that the battery separator of Example 2 was used.

Example 3

Battery Separator

Ethyl acetate was added to the ethyl acetate solution 1 prepared in the same manner as in Example 1, and the mixture was stirred at room temperature to obtain a homogeneous polymer solution 10 with a concentration of 4.40% by weight.

Next, as inorganic particles, a silica particle dispersion liquid 11 ("MEK-ST-UP" manufactured by Nissan Chemical Industries. Ltd.: a methyl ethyl ketone solution of a silica sol, with a solid content of 20% by weight, and a silica particle size of 10 to 20 nm (elongated shape)) was added to the polymer solution 10 so that the ratio of the solids in the silica particle dispersion liquid 11 to the solids in the polymer solution 10 was 30% by weight. Thus, an inorganic particle/crosslinked polymer mixed solution 12 was obtained.

Next, the crosslinking agent solution 5 used in Example 1 was prepared, and added to the inorganic particle/crosslinked polymer mixed solution 12 so that the ratio of the solids in the crosslinking agent solution 5 to the solid crosslinked polymer in the inorganic particle/crosslinked polymer mixed solution 12 was 0.7% by weight. The solid content of the resulting mixed solution 13 was 5% by weight.

The mixed solution 13 thus obtained was applied onto one surface of a porous polyethylene resin film as a substrate (with a thickness of 16 μm, a porosity of 60%, an air permeability of 100 sec/100 cc, and a puncture strength of 3.0 N) with a wire bar (#20), and heated and dried at 50° C. to evaporate ethyl acetate. Then, the film was placed in a drying oven at 90° C. for 168 hours so that the (meth)acrylate copolymer was isocyanate-crosslinked. In this way, a battery separator of Example 3, including a porous film and a layer (crosslinked polymer layer) containing a crosslinked (meth)acrylate copolymer and inorganic particles and supported on one surface of the porous film, was obtained. The content of silica particles in the crosslinked polymer layer thus obtained was 23.1% by weight.

The thickness of the resulting crosslinked polymer layer was 0.34 μm. The measured air permeability of the battery separator was 10000 sec/100 cc or more. This result confirmed that a substantially non-porous crosslinked polymer layer was supported. Furthermore, the measured gel fraction was 61%. This result confirmed that a part of the crosslinked polymer layer thus prepared was crosslinked.

<Electrode Sheet>

A positive electrode sheet and a negative electrode sheet were prepared in the same manner as in Example 1.

<Preparation of Lithium Ion Secondary Battery>

A lithium ion secondary battery was prepared in the same manner as in Example 1 except that the battery separator of Example 3 was used.

Comparative Example 1

Battery Separator

A porous polyethylene resin film with a thickness of 16 μm, a porosity of 60%, an air permeability of 100 sec/100 cc, and a puncture strength of 3.0 N was prepared as a battery separator of Comparative Example 1.

<Electrode Sheet>

A positive electrode sheet and a negative electrode sheet were prepared in the same manner as in Example 1.

<Preparation of Lithium Ion Secondary Battery>

A lithium ion secondary battery was prepared in the same manner as in Example 1 except that the battery separator of Comparative Example 1, that is, a porous film alone was used as a battery separator.

Comparative Example 2

Battery Separator

Ethyl acetate was added to the ethyl acetate solution 1 prepared in the same manner as in Example 1, and the mixture was stirred at room temperature to obtain a homogeneous polymer solution 14 with a concentration of 3.97% by weight.

Next, the crosslinking agent solution 5 prepared in the same manner as in Example 1 was added to the polymer solution 14 so that the ratio of the solids in the crosslinking agent solution 5 to the solids in the polymer solution 14 was 0.7% by weight. The solid content of the resulting mixed solution 15 was 4% by weight.

The mixed solution 15 thus obtained was applied onto one surface of a porous polyethylene resin film as a substrate (with a thickness of 16 μm, a porosity of 60%, an air permeability of 100 sec/100 cc, and a puncture strength of 3.0 N) with a wire bar (#20), and heated and dried at 50° C. to evaporate ethyl acetate. Then, the film was placed in a drying oven at 90° C. for 168 hours so that the (meth)acrylate copolymer was isocyanate-crosslinked. In this way, a battery separator of Comparative Example 2, including a porous film and a crosslinked (meth)acrylate copolymer layer supported on one surface of the porous film, was obtained. The thickness of the resulting (meth)acrylate copolymer layer was 0.30 μm. The measured air permeability of the battery separator was 10000 sec/100 cc or more. This result confirmed that a substantially non-porous (meth)acrylate copolymer layer was supported. Furthermore, the measured gel fraction was 15%.

This result confirmed that a part of the (meth)acrylate copolymer layer thus prepared was crosslinked.

<Electrode Sheet>

A positive electrode sheet and a negative electrode sheet were prepared in the same manner as in Example 1.

<Preparation of Lithium Ion Secondary Battery>

A lithium ion secondary battery was prepared in the same manner as in Example 1 except that the battery separator of Comparative Example 2 was used.

The initial characteristics of the lithium ion secondary batteries of Examples 1 to 3 and Comparative Examples 1 and 2 thus prepared were measured by the methods described above to examine the dependence of the battery characteristics on the presence of the crosslinked polymer layer. Table 1 shows the results. Table 1 also shows the measurement results of the air permeabilities of the battery separators used in these examples and comparative examples, and the thicknesses and gel fractions of the crosslinked polymer layers of the battery separators.

TABLE 1

|  | Air permeability (second/100 cc) | Crosslinked polymer layer Thickness (μm) | Crosslinked polymer layer Gel fraction (%) | Initial charge capacity (mAh) | Initial discharge capacity (mAh) | Initial charge-discharge efficiency (%) |
| --- | --- | --- | --- | --- | --- | --- |
| Example 1 | 10000 or more | 0.27 | 47 | 23.7 | 21.7 | 91.6 |
| Example 2 | 10000 or more | 0.30 | 38 | 23.2 | 21.3 | 91.8 |
| Example 3 | 10000 or more | 0.34 | 61 | 23.7 | 21.9 | 92.4 |
| Comparative Example 1 | 100 | — | — | 23.8 | 22.1 | 92.9 |
| Comparative Example 2 | 10000 or more | 0.30 | 15 | 23.8 | 22.0 | 92.4 |

The results of the battery separators of Examples 1 to 3 each including a crosslinked polymer layer containing inorganic particles, the battery separator of Comparative Example 1 made of a porous film alone, and the battery separator of Comparative Example 2 including a crosslinked polymer layer not containing inorganic particles were compared, but there was no significant difference in the battery characteristics. This result shows that even if the battery separator of the present invention including the crosslinked polymer layer containing the crosslinked polymer and the inorganic particles is used, the initial characteristics of the resulting lithium ion secondary battery do not deteriorate.

Next, the initial output characteristics of the lithium ion secondary batteries of Examples 1 to 3 and Comparative Examples 1 and 2 were examined. Table 2 shows the results. Table 2 also shows the particle sizes of the inorganic particles used in these examples and comparative examples, and the contents of the inorganic particles in the crosslinked polymer layers ((weight of inorganic particles)×100/(weight of entire crosslinked polymer layer)).

TABLE 2

|  | Particle size of norganic particles (nm) | Content of inorganic particles in crosslinked polymer layer (weight %) | 0.5-hour rate discharge capacity ratio (%) |
| --- | --- | --- | --- |
| Example 1 | 10 to 20 | 23.1 | 72.3 |
| Example 2 | 40 to 50 | 23.1 | 74.9 |
| Example 3 | 10 to 20 | 23.1 | 75.0 |
| Comparative Example 1 | — | — | 78.4 |
| Comparative Example 2 | — | — | 64.1 |

The results of Examples 1 to 3 and the result of Comparative Example 2 were compared. The comparison shows that the output characteristics are improved when the battery separators each including a crosslinked polymer layer containing inorganic particles (Examples 1 to 3) are used rather than the battery separator including a crosslinked polymer layer not containing inorganic particles.

Next, the oxidation resistance and the output characteristics after the oxidation resistance test of the lithium ion secondary batteries of Examples 1 to 3 and Comparative Examples 1 and 2 were examined. Table 3 shows the results. Table 3 also shows the thicknesses and gel fractions of the crosslinked polymer layers of these examples and comparative examples, and the initial discharge capacities of the batteries.

TABLE 3

|  | Initial discharge capacity (mAh) | Crosslinked polymer layer Thickness (μm) | Crosslinked polymer layer Gel fraction (%) | Discharge capacity at oxidation resistance test (mAh) | 1-hour rate discharge capacity ratio after oxidation resistance test (%) |
| --- | --- | --- | --- | --- | --- |
| Example 1 | 21.7 | 0.27 | 47 | 21.5 | 63.7 |
| Example 2 | 21.3 | 0.30 | 38 | 20.2 | 60.4 |
| Example 3 | 21.9 | 0.34 | 61 | 20.5 | 68.5 |
| Comparative Example 1 | 22.1 | — | — | 15.1 | 29.0 |
| Comparative Example 2 | 22.0 | 0.30 | 15 | 16.4 | 20.0 |

The battery separator of Comparative Example 2 including a crosslinked polymer layer not containing inorganic particles was compared with that of Comparative Example 1 not including a crosslinked polymer layer. As a result, when the former was used, a higher discharge capacity at the oxidation resistance test was obtained, that is, the oxidation resistance was improved. However, when the battery separators of Examples 1 to 3 each including a crosslinked polymer layer containing inorganic particles were used, much higher discharge capacities at the oxidation resistance test were obtained, that is, much better oxidation resistance was obtained than the battery separator of Comparative Example 2. Furthermore, the comparison of the 1-hour rate discharge capacity ratios after the oxidation resistance test shows that Examples 1 to 3 achieved better results than Comparative Examples 1 and 2. These results show that the battery separator including the crosslinked polymer layer containing inorganic particles has more improved oxidation resistance than the battery separator including the crosslinked polymer layer not containing inorganic particles. The above results also show that the use of the battery separator containing inorganic particles significantly reduces the deterioration of the output characteristics even after the battery was exposed to high temperatures in a charging state for a long period of time.

Example 4

Battery separators and lithium ion secondary batteries of Examples 4-1 to 4-7 were prepared to see the dependence of the battery characteristics on the content of inorganic particles in the crosslinked polymer layer.

<Battery Separator>

Ethyl acetate was added to the ethyl acetate solutions 1 prepared in the same manner as in Example 1, and the mixtures were stirred at room temperature to obtain homogeneous polymer solutions 4-1 to 4-7 with concentrations of 4.94% by weight (4-1), 4.78% by weight (4-2), 4.60% by weight (4-3), 3.99% by weight (4-4), 3.74% by weight (4-5), 3.33% by weight (4-6), and 2.22% by weight (4-7) respectively.

Next, the silica particle dispersion liquid 7 ("MEK-ST-L" manufactured by Nissan Chemical Industries. Ltd.: a methyl ethyl ketone solution of a silica sol, with a solid content of 30% by weight, and a silica particle size of 40 to 50 nm) was added to the polymer solutions 4-1 to 4-7 so that the ratios of the solids in the silica particle dispersion liquid 7 to the solids in the polymer solutions 4-1 to 4-7 were 1% by weight (4-1), 5% by weight (4-2), 10% by weight (4-3), 30% by weight (4-4), 40% by weight (4-5), 60% by weight (4-6), and 150% by weight (4-7) respectively. Thus, inorganic particles/crosslinked polymer mixed solutions 4-1 to 4-7 were obtained.

Next, the crosslinking agent solution 5 used in Example 1 was prepared, and added to the inorganic particle/crosslinked polymer mixed solutions 4-1 to 4-7 so that the ratios of the solids in the crosslinking agent solution 5 to the solid crosslinked polymer in the inorganic particle/crosslinked polymer mixed solutions 4-1 to 4-7 were 0.7% by weight. The solid contents of the resulting mixed solutions 4-1 to 4-7 were all 5% by weight.

Each of the mixed solutions 4-1 to 4-7 thus obtained was applied onto one surface of a porous polyethylene resin film (with a thickness of 16 μm, a porosity of 60%, an air permeability of 100 sec/100 cc, and a puncture strength of 3.0 N) with a wire bar (#20), and heated and dried at 50° C. to evaporate ethyl acetate. Then, the film was placed in a drying oven at 90° C. for 168 hours so that the (meth)acrylate copolymer was isocyanate-crosslinked. In this way, battery separators of Examples 4-1 to 4-7, each including a porous film and a layer (crosslinked polymer layer) containing a crosslinked (meth)acrylate copolymer and inorganic particles and supported on one surface of the porous film, were obtained.

The contents of silica particles in the crosslinked polymer layers thus obtained in Examples 4-1 to 4-7 were 1.0% by weight (4-1), 4.7% by weight (4-2), 9.0% by weight (4-3), 23.1% by weight (4-4), 28.4% by weight (4-5), 37.3% by weight (4-6), and 59.8% by weight (4-7) respectively.

<Electrode Sheet>

Positive electrode sheets and negative electrode sheets were prepared in the same manner as in Example 1.

<Preparation of Lithium Ion Secondary Battery>

Lithium ion secondary batteries of Examples 4-1 to 4-7 were prepared in the same manner as in Example 1 except that the battery separators of Examples 4-1 to 4-7 were used.

The oxidation resistance and the output characteristics after the oxidation resistance test of the lithium ion secondary batteries of Examples 4-1 to 4-7 were examined. Table 4 shows the results. Table 4 also shows the measurement results of the air permeabilities of the battery separators used in Examples 4-1 to 4-7, and the thicknesses and gel fractions of the crosslinked polymer layers.

TABLE 4

| Example | Weight content of silica particles (%) | Air permeability (second/100 cc) | Crosslinked polymer layer | | Initial 0.5-hour rate discharge capacity ratio (%) | Discharge capacity at oxidation resistance test (mAh) | 1-hour rate discharge capacity ratio after oxidation resistance test (%) |
|---|---|---|---|---|---|---|---|
| | | | Thickness (μm) | Gel fraction (%) | | | |
| 4-1 | 1.0 | 10000 or more | 0.31 | 17 | 65.3 | 17.0 | 28.9 |
| 4-2 | 4.7 | 10000 or more | 0.30 | 20 | 70.0 | 18.2 | 40.0 |
| 4-3 | 9.0 | 10000 or more | 0.32 | 25 | 72.1 | 19.3 | 55.0 |
| 4-4 | 23.1 | 10000 or more | 0.30 | 38 | 74.9 | 20.2 | 60.4 |
| 4-5 | 28.4 | 10000 or more | 0.29 | 55 | 75.0 | 19.8 | 58.4 |
| 4-6 | 37.3 | 8100 | 0.25 | 60 | 75.5 | 19.6 | 51.1 |
| 4-7 | 59.8 | 1550 | 0.10 | 71 | 76.5 | 17.5 | 48.7 |

The above results show that when the crosslinked polymer layer contained 4.5 to 60% by weight of inorganic particles, the resulting lithium ion secondary battery had excellent initial rate characteristics and oxidation resistance and was less susceptible to deterioration of the output characteristics even after it was exposed to high temperatures in a charging state for a long period of time.

INDUSTRIAL APPLICABILITY

The battery separator of the present invention can be suitably used as a separator for a non-aqueous electrolyte secondary battery such as a lithium ion secondary battery.

The invention claimed is:

1. A battery separator comprising:
   a substrate made of a porous film; and
   a crosslinked polymer layer supported on the substrate,
   wherein the crosslinked polymer layer contains a crosslinked polymer and inorganic particles, and the crosslinked polymer layer is non-porous, the crosslinked polymer being obtained by reacting a reactive polymer having a functional group in its molecule with a polyfunctional compound reactive with the functional group so as to crosslink at least a part of the reactive polymer.

2. The battery separator according to claim 1, wherein the reactive polymer is a (meth)acrylate copolymer.

3. The battery separator according to claim 1, wherein the inorganic particles are silica particles.

4. The battery separator according to claim 1, wherein the inorganic particles have a particle size of 10 to 200 nm.

5. The battery separator according to claim 1, wherein the crosslinked polymer layer contains 4.5 to 60% by weight of the inorganic particles.

6. The battery separator according to claim 1, wherein the crosslinked polymer layer has a gel fraction of 30% or more.

7. The battery separator according to claim 1, wherein
the polyfunctional compound is a polyfunctional isocyanate, and
the functional group contained in the reactive polymer is a reactive group reactive with an isocyanate group.

8. The battery separator according to claim 1, wherein the crosslinked polymer layer has a thickness of 0.05 to 1 μm.

9. The battery separator according to claim 1, wherein the porous film contains polyethylene.

10. A lithium ion secondary battery comprising:
    a positive electrode;
    a negative electrode;
    a battery separator disposed between the positive electrode and the negative electrode; and
    a non-aqueous electrolyte solution containing a non-aqueous solvent and an electrolyte,
    wherein the battery separator is the battery separator according to claim 1, and is disposed between the positive electrode and the negative electrode so that the substrate faces the negative electrode and the crosslinked polymer layer faces the positive electrode.

11. A method of producing a lithium ion secondary battery, comprising the steps of:
    (I) disposing the battery separator according to claim 1 between a positive electrode and a negative electrode so that the substrate faces the negative electrode and the crosslinked polymer layer faces the positive electrode, so as to form a layered structure of the positive electrode, the battery separator, and the negative electrode;
    (II) placing the layered structure in a battery case; and
    (III) pouring an electrolyte solution into the battery case.

12. The battery separator according to claim 1, wherein an air permeability of the battery separator including the crosslinked polymer layer supported on one surface of the substrate is higher than that of the substrate alone by 5000 sec/100 cc or more.

13. The battery separator according to claim 2, wherein the (meth)acrylate copolymer consists of (meth)acrylate monomers.

14. A method of producing a battery separator, comprising the steps of:
    (i) preparing a mixed solution containing a reactive polymer having a functional group in its molecule, a polyfunctional compound reactive with the functional group, inorganic particles, and a solvent;
    (ii) forming a film containing the reactive polymer, the polyfunctional compound, and the inorganic particles on one surface of a substrate made of a porous film by using the mixed solution; and
    (iii) crosslinking at least a part of the reactive polymer by applying external energy to the film, so as to form a non-porous crosslinked polymer layer containing a crosslinked polymer and the inorganic particles and supported on the porous film.

* * * * *